(12) United States Patent
Knight

(10) Patent No.: US 7,383,457 B1
(45) Date of Patent: Jun. 3, 2008

(54) ADAPTIVE POWER-REDUCTION MODE

(75) Inventor: Brent E. Knight, Austin, TX (US)

(73) Assignee: Apple Inc., Cupertino, CA (US)

( * ) Notice: Subject to any disclaimer, the term of this patent is extended or adjusted under 35 U.S.C. 154(b) by 398 days.

(21) Appl. No.: 11/087,119

(22) Filed: Mar. 23, 2005

(51) Int. Cl.
*G06F 1/00* (2006.01)

(52) U.S. Cl. .................... 713/323; 713/320

(58) Field of Classification Search ........... 713/300
See application file for complete search history.

(56) References Cited

U.S. PATENT DOCUMENTS

| | | | | |
|---|---|---|---|---|
| 6,516,421 | B1 * | 2/2003 | Peters | 713/502 |
| 6,718,313 | B1 * | 4/2004 | Lent et al. | 705/38 |
| 6,961,747 | B2 * | 11/2005 | Sakaguchi et al. | 709/201 |
| 7,113,809 | B2 * | 9/2006 | Noesgaard et al. | 455/566 |
| 7,203,848 | B2 * | 4/2007 | Mitsubori et al. | 713/300 |

* cited by examiner

*Primary Examiner*—Chun Cao
(74) *Attorney, Agent, or Firm*—Williams, Morgan & Amerson, P.C.

(57) ABSTRACT

A method, apparatus, and system comprises monitoring an idle time period associated with a device and providing an adaptive power-save mode based upon a determination that the idle time period has exceeded a predetermined threshold. Providing the adaptive power-save mode comprising detecting a power-up response subsequent to an initiation of a power-save mode and modifying the predetermined threshold based upon the power-up response.

29 Claims, 10 Drawing Sheets

ADAPTIVE POWER-REDUCTION MODE

BACKGROUND OF THE INVENTION

1. Field of the Invention

This invention relates generally to controlling a power-reduction mode of a device, and, more particularly, to a method, apparatus, and system for providing an adaptive implementation of a power-savings mode of a device.

2. Description of the Related Art

Devices, such as computer systems, telephonic devices, personal data assistants (PDAs), and the like, use a significant amount of power during operations. Various portions of these devices may be idle for extended periods of time, resulting in exceeding amounts of power consumption. These devices include various peripheral and/or critical components, such as monitors, displays, hard drives, CD/DVD drives, and the like. During periods of idle modes, many of these peripheral and/or critical components may be placed in power-reduction or power-save modes. The power-save modes may include dimming display screens, slowing an operation speed of a component, stopping the spinning of a hard drive, etc.

Often, computer devices are sent into a power-save mode after a prolonged period of idleness. During a power-save or a power-reduction mode, various peripheral devices associated with the computer device are placed in a power down or sleep mode. For example, the monitor of a computer device may be dimmed or effectively turned off after a predetermined amount of idle time. Similarly, other devices, such as cellular telephones, pagers, PDAs, and the like, may implement a power-save mode where the screens of these devices are dimmed or turned off. Another example of a power-save mode may include the power down mode of a hard disk, wherein the hard disk stops spinning after a certain amount of idle time. Often, these power-save modes are implemented into remote devices, such as battery operated devices, including laptop computers, cell phones, personal digital assistants, PDAs, etc. However, power-save modes may also be useful in saving power for non-battery operated devices, such as desktop computers, mainframes, and the like.

Turning now to FIG. 1, a flowchart depicting a prior art process flow for a power-save mode for a device is illustrated. Initially, a device is activated for various operations particular to the type of device (block 110). During the operation of the device, an idle period may be monitored to determine if a predetermined time period has elapsed during which the device is in an idle mode (block 120). The idle mode may include various situations, such as no data being entered into a computer system, no extraction of data from a computer system, no activity relating to the interface of a cellular telephone or a PDA, and the like. When the idle time is monitored, the device may make a determination whether the idle time, or the time period associated with the idle time, has exceeded a predetermined threshold (block 130). For example, if a device is in an idle mode for greater than three minutes, the device may be placed into a power-save mode, where various portions of the device may be shut down or placed into a sleep mode (block 140). Upon a determination that the idle time has not exceeded the threshold required for entering a power-save mode, the idle time may be continuously monitored. The initiation of the power-save mode may include dimming a monitor, stopping the spin of a hard disk or a CD ROM drive, reducing the majority of the operations of a transmission circuit in a cellular telephone, and/or the like.

One problem associated with state-of-the-art power-save modes in various devices includes the fact that the power-save mode may turn off a particular function associated with a device that a user may desire to be active at that time. For example, when the display associated with the computer devices dims or darkens, the user may be unable to read it even though the user was actually using the data displayed on the display device without actively interfacing with the computer system. As another example, if the hard drive of a computer system stops spinning, the next time the user requires data from the hard drive, an additional delay may occur before the user can acquire the desired data. These delays may cause various distractions and/or annoyances when a user interfaces a particular device.

In order to address this problem, designers have provided the user with the ability to turn off or modify the idle time threshold before a particular device enters into a sleep mode. However, there are additional problems associated with this methodology. One problem includes the fact that the user may forget to re-implement the idle power-save mode to its original state, thereby leaving open the possibility that the device will not subsequently implement an efficient power-save mode. This may result in wasted power or an unanticipated reduction in battery life associated with the device. A user may forget to reinstate the idle time and because of such an oversight, the user may be reluctant to modify the idle time associated with the power-save mode. Therefore, the user may be forced to endure distractions and annoyances associated with the power-save modes that may shut down a portion of a device, even though the user was using the device.

The present invention is directed to overcoming or at least reducing one or more of the problems set forth above.

SUMMARY OF THE INVENTION

In one aspect of the present invention, a method is provided for an adaptive power-reduction mode. The method comprises monitoring an idle time period associated with a device and providing an adaptive power-save mode upon a determination that the idle time period has exceeded a predetermined threshold, providing the adaptive power-save mode comprising detecting a power-up response subsequent to an initiation of a power-save mode and modifying the predetermined threshold based upon the power-up response.

In another aspect of the present invention, a method is provided for an adaptive power-reduction mode. The method comprises initiating a power-save mode associated with a device and determining whether a power-up response has occurred subsequent to the initiating of the power-save mode. The method further comprises characterizing the power-up response and modifying an idle time period associated with initiating the power-save mode based upon the characterizing of a power-up event.

In a further aspect of the present invention, a method is provided for an adaptive power-reduction mode. The method comprises monitoring a device for detecting a power-up event subsequent to an initiation of a power-save mode associated with the device and determining whether the power-up event occurred before a predetermined time period. The method further comprises delaying an initiation of a subsequent power-save mode based upon a determination that the power-up event occurred before the predetermined time period.

In another aspect of the present invention, a system is provided for an adaptive power-reduction mode. The system comprises a device operatively coupled to a controller. The device is adapted to initiate a power-save mode based upon an idle time associated with an operation of the device. The controller is adapted to determine whether a power-up response has occurred subsequent to an initiating of the power-save mode. The controller is also adapted to modify an idle time period associated with initiating the power-save mode based upon the power-up event.

In another aspect of the present invention, a computer system is provided for an adaptive power-reduction mode. The computer system comprises a peripheral device operatively coupled to a controller. The peripheral device is adapted to initiate a power-save mode based upon an idle time associated with an operation of the device. The controller is adapted to determine whether a power-up response has occurred subsequent to an initiating of the power-save mode. The controller is further adapted to modify an idle time period associated with initiating the power-save mode based upon the power-up event.

In yet another aspect of the present invention, a computer readable program storage device encoded with instructions is provided for an adaptive power-reduction mode. The computer readable program storage device encoded with instructions that, when executed by a computer, performs a method, comprising: monitoring an idle time period associated with a device and providing an adaptive power-save mode upon a determination that the idle time period has exceeded a predetermined threshold. The instructions that, when executed by a computer, further provide the adaptive power-save mode comprising determining a power-up response subsequent to an initiation of a power-save mode and modifying the predetermined threshold based upon the determining of the power-up response.

In yet another aspect of the present invention, a method is provided for an adaptive power-reduction mode. Data relating to a power-up event relating to a device in a power-save mode is received. A determination is made as to whether the power-up event occurred before a predetermined time period. An initiation of a subsequent power-save mode is delayed based upon a determination that the power-up event occurred before the predetermined time period.

In another aspect of the present invention, an adaptive power-save control unit is provided for an adaptive power-reduction mode. The adaptive power-reduction mode includes a controller. The controller is adapted to determine whether a power-up response has occurred subsequent to an initiating of the power-save mode. The controller is also adapted to modify an idle time period associated with initiating the power-save mode based upon the power-up event.

In yet another aspect of the present invention, a delay table is provided for an adaptive power-reduction mode. The delay table includes data the comprises information relating to determining whether the power-up event occurred before a predetermined time period and delaying an initiation of a subsequent power-save mode based upon a determination that the power-up event occurred before the predetermined time period.

BRIEF DESCRIPTION OF THE DRAWINGS

The invention may be understood by reference to the following description taken in conjunction with the accompanying drawings, in which like reference numerals identify like elements, and in which.

Figure 1:
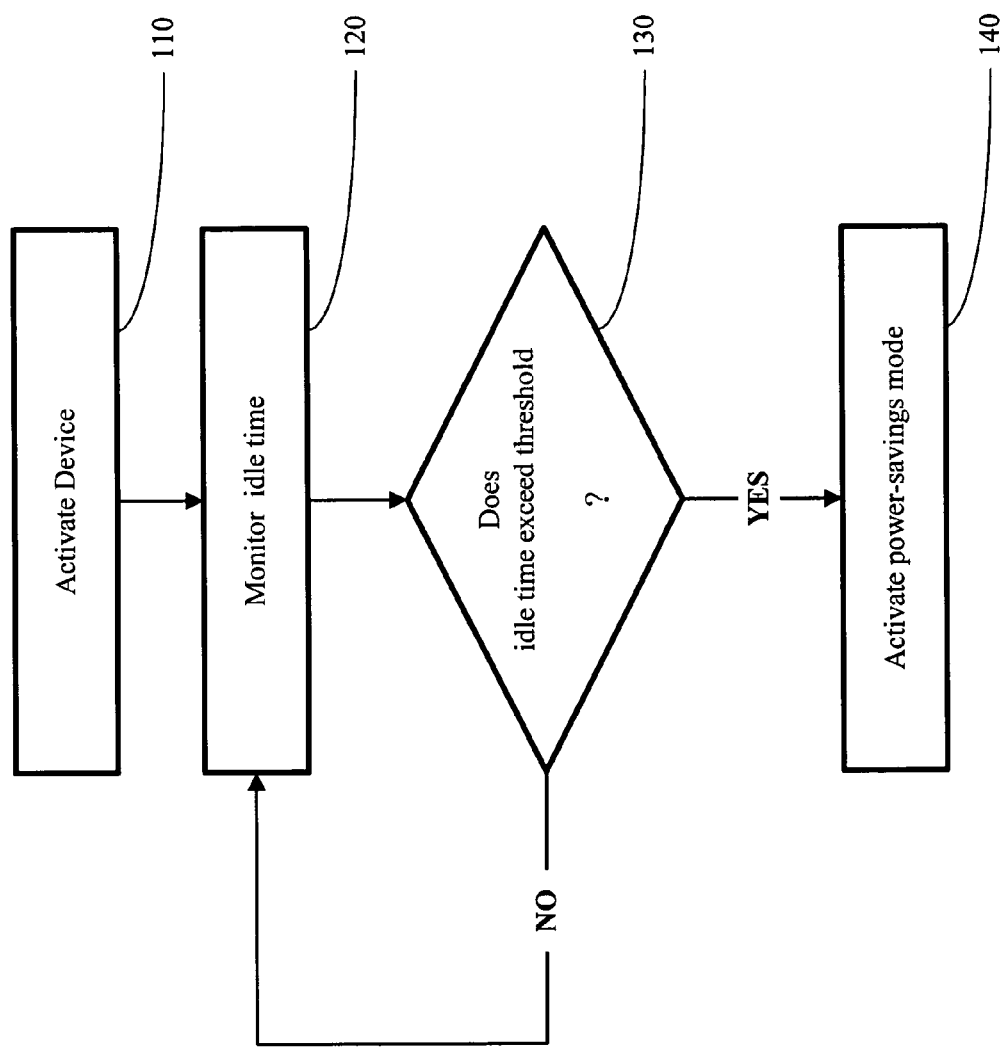
FIG. 1 illustrates flowchart depiction of a prior art method for activating a power-save mode.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Embodiments of the present invention provide for an adaptive response to idle time issues associated with a power-save or a power-reduction mode associated with a device. Embodiments of the present invention provide for detecting whether a user is actually interfacing with or using a particular device when it enters into a power-save mode, and adjusting the idle time required to enter the power-save mode without permanently changing the setting associated with the power-save mode. Embodiments of the present invention provide for detecting an "annoyance factor" associated with a power-save mode. The annoyance factor may relate to detecting a perceived annoyance that a user may experience when a device prematurely enters a power-save mode in response to a detection of substantial idle time experienced by the device. The annoyance factor may also refer to a length of time that should pass before a power save mode is implemented. For example, the higher the annoyance factor, the longer the length of time before a power save mode is initiated. The annoyance factor may also relate to a quantitative desire of a user to continue normal operations of a device, even though it appears that the device is in an idle mode for a predetermined amount of time. For example, a user of a computer may not interact with the computer for a substantial amount of time, yet the user may be examining data displayed by the computer monitor. In this case, a false perception of excessive idle time may be realized, prompting an initiation of a power-save mode. In response to this unwanted power-save mode, the user may provide a power-up event that may be characterized. Characterizing the power-up event may include defining or determining the type of power-up activity. For example, a relatively quick power-up event may be defined as a more intense power-up activity that may result in delaying a subsequent power-down event. The characterization of the type of power-up event may provide embodiments of the present invention with an insight to the user's annoyance factor based upon the user's reaction. The term "Idle time" may refer to a variety of operational circumstances of a device, such as lack of data transfer, lack of input signal(s) detected, lack of outgoing signal(s), no activations of an input key from a peripheral device, or any type of operational circumstance that is different from a predetermined type of reference operation.

Those skilled in the art having benefit of the present invention may use a variety of indications to detect an annoyance factor in order to implement the novel concepts provided by the present disclosure. Examples of indications that relate to the user's annoyance factor may include, but are not limited to, an indication of how quickly the user takes action to bring the device out of the power-save mode, the intensity of an action that is taken by the user to bring the device out of power-save mode, e.g., the force at which a key is depressed, an audible indication, or any other type of power-up event. The annoyance factor may be used by embodiments of the present invention to adaptively adjust the onset of a subsequent power-save mode of the device.

Based upon the annoyance factor, the rate of the power-save mode entry is adaptively delayed to reduce the amount of perceived annoyance a user may encounter when a device that the user is using enters a power-save mode. For example, embodiments of the present invention provide for detecting a power-up activity or event and characterizing the power-up activity. For example, if the power-up activity occurs immediately after a power-save mode is initiated, an adaptive change may be implemented based upon the immediacy of the power-up activity detected after the power-save mode was initiated. A time period may be measured when the power-save mode is exited in response to a power-up activity, and the next power-save mode may be slightly delayed. If another predetermined amount of time elapses when the device is in an idle mode, the next power-save mode is initiated. If an annoyance factor is detected when the following power-up activity is detected, i.e., the power-up activity comes relatively fast after the power-save mode is initiated; an even greater delay is adaptively implemented before a subsequent power-save mode is initiated. Therefore, embodiments of the present invention provide for adaptively modifying the power save-mode to reduce annoyances or distractions encountered by a user using a particular device, even though a significant amount of idle time is detected.

Figure 2:
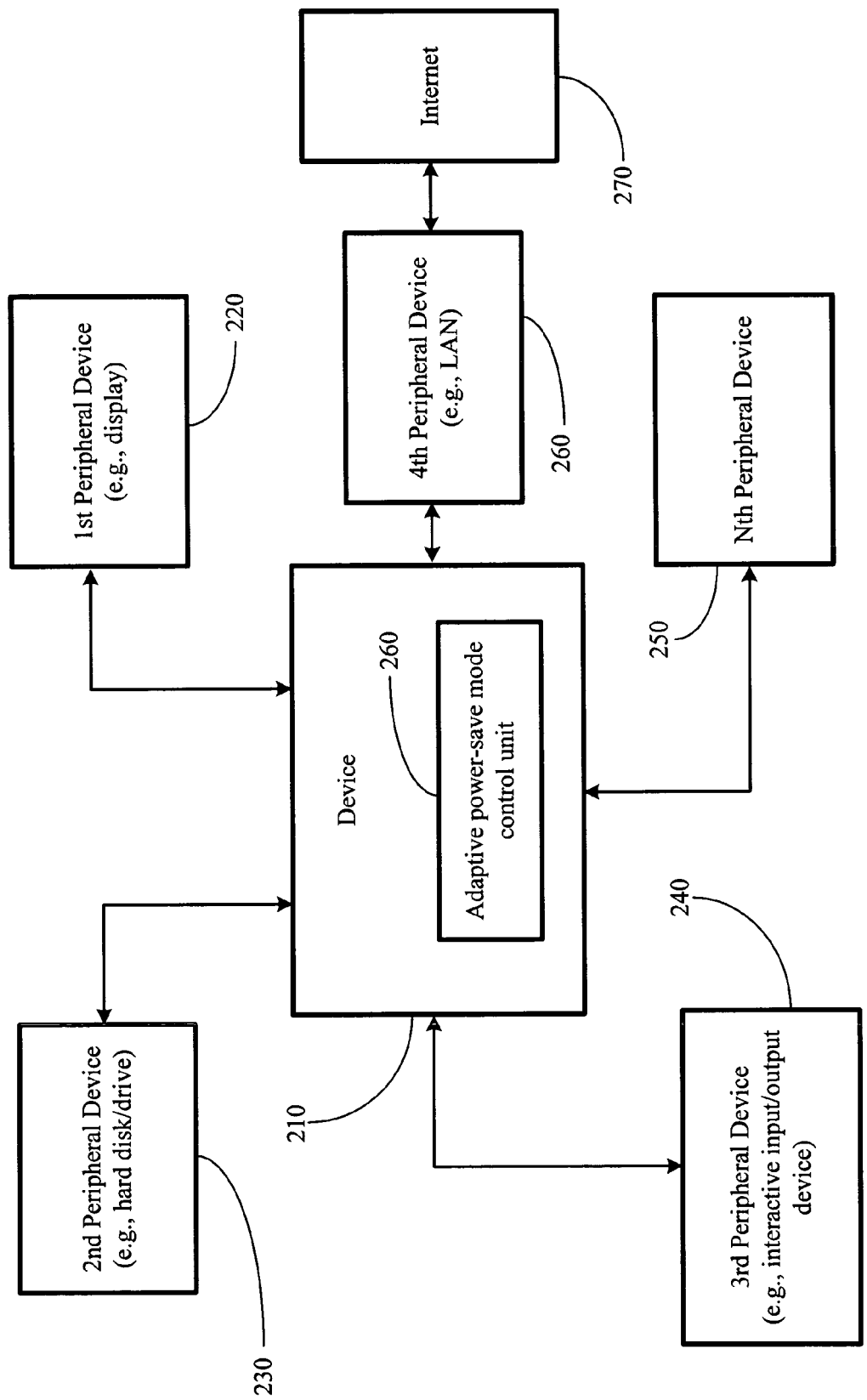
FIG. 2 illustrates a block diagram depiction of a system that includes a device comprising an adaptive power-save mode control unit, in accordance with one illustrative embodiment of the present invention.

Turning now to FIG. 2, a device 210 capable of implementing an adaptive power-save mode, in accordance with embodiments of the present invention is illustrated. The device 210 may be one of a variety of electronic devices, such as a computer, a cell phone, a telephone, a pager, a scanner, a copy machine, a fax machine, a television, a stereo, and the like. As an example, the device 210 may be a computer, which may be a desktop computer or server, such as an Apple Macintosh®, a classic Apple Mac®, a Power Mac G4®, a Power Mac G5®, an iMac®, an IBM compatible personal computer (PC), and the like. Further, these desktop computers, such as the Apple Macintosh®, may be coupled together via a $4^{th}$ peripheral device (e.g., a local area network [LAN]) 260, e.g., a sub-LAN, with the LAN being coupled to the Internet 270. In an alternative embodiment, the device 210 may be a computer system that is a portable device, such as an Apple PowerBook® or iBook®.

Various peripheral devices associated with a particular device 210 may provide for various functions such as data entry, data display, and the like. For example, the device 210 may be a computer device, which may comprise a first peripheral device 220, a second peripheral device 230, and a third peripheral device 240 through an $N^{th}$ peripheral device 250. The device 210 may comprise an adaptive power-save mode control unit 260 that is capable of implementing an adaptive control of one or more power-save modes that may be activated by the device 210. In one embodiment, the adaptive power-save mode control unit 260 may include hardware components, software components, firmware components, and/or a combination of the three.

The first peripheral device 220 may be a display monitor or a display screen associated with the device 210, which as described above, may be a computer device. The second peripheral device 230 may be a hard disk or hard drive associated with the computer device. The third peripheral device 240 may be an interactive input/output device, such as an interactive keyboard, interactive mouse, a set of front panel switches, touch screen interface, and the like. The interactive input/output device may be any device that could indicate to the device 210 whether the interactive input/output device is in an idle mode or not. The interactive keyboard may comprise a display as well as keys for entry of data. Various other peripherals may be associated with a computer device.

The adaptive power-save mode control unit 260 is capable of detecting an intensity or type of power-up event (provided by a user) that is provided in response to the entry or initiation of a power-save mode. Based upon the type of intensity or type of the power-up response or event, the adaptive power-save mode control unit 260 may adaptively adjust the onset of a subsequent power-save mode. For example, if a user is reading data from a monitor, yet no activity is detected by the device 210, upon entry of a power-save mode where the monitor is dimmed, a fast response by the user may be interpreted as a relatively large annoyance factor, depending on the quickness of the power-up response by the user. The power-up response may be provided by a user, an application, or a device. In one embodiment, a data packet (e.g., a "magic packet" a "wake on LAN" packet) may be received, providing a power-up response and/or information relating to the type of power-up response. The power-up activity data may be received from any device, include a computer coupled to the network system 310. Other examples may include detecting the setting or re-setting of one or bits in a register or an input may be detected, indicating a power-up response and/or information relating to the type of power-up response. Based upon the annoyance factor or the type of the power-up activity, an additional delay may be implemented before the onset of a subsequent power-save mode under the assumption that the user may actually be using the device 210 even though inactivity or idleness is detected. Greater details associated with the device 210 and the adaptive power-save mode control unit 260 are provided in subsequent figures and accompanying description below.

Figure 3:
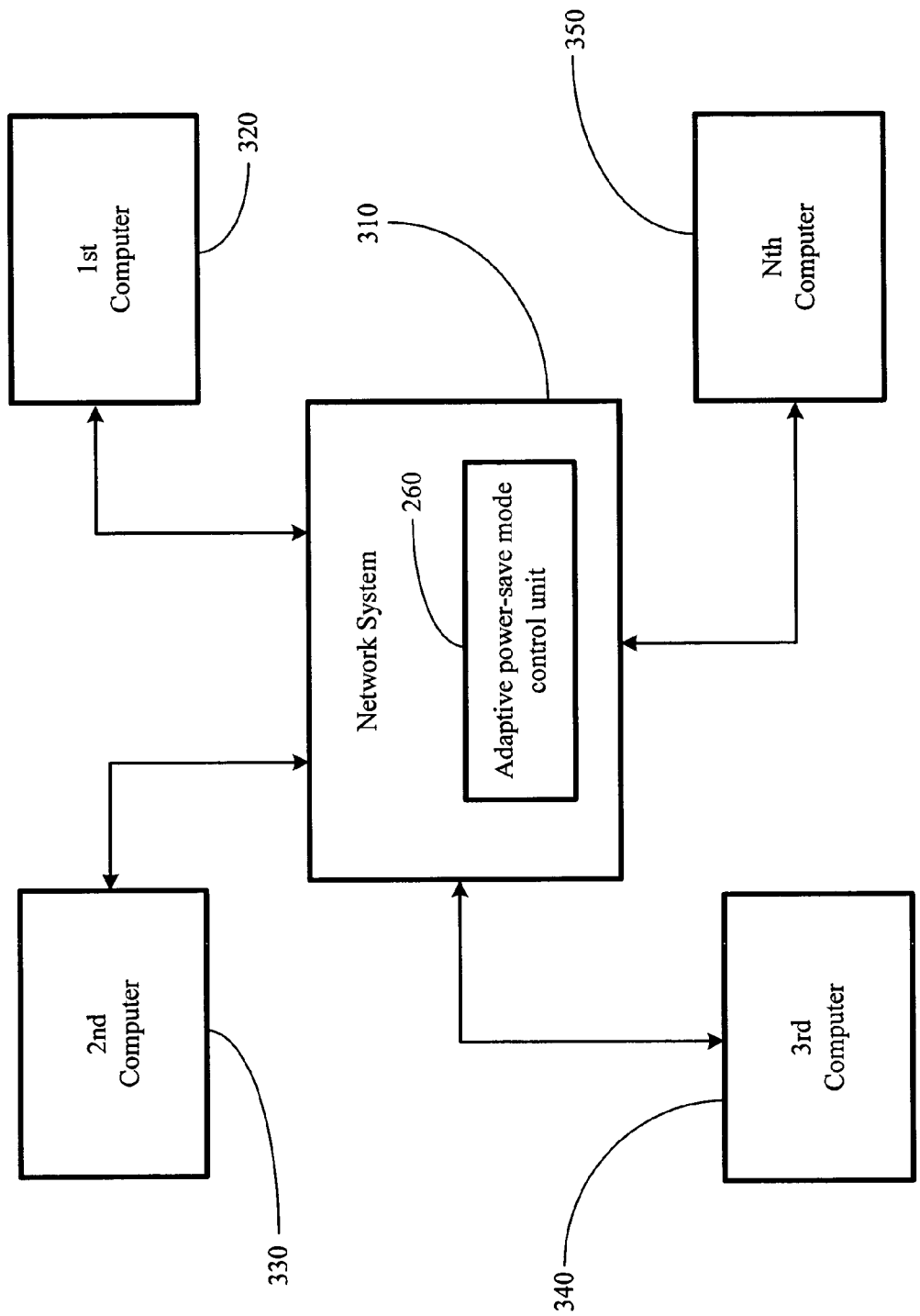
FIG. 3 illustrates a network system comprising an adaptive power-save mode control unit and a plurality of computers, in accordance with one illustrative embodiment of the present invention.

Turning now to FIG. 3, a series of computers associated with a network system 310 is illustrated in a block diagram depiction. The network system 310 may be linked to a $1^{st}$ computer 320, a $2^{nd}$ computer 330, and a $3^{rd}$ computer 340 through an $N^{th}$ computer 350. The network system 310 may be a LAN, a private network system, or a public system, such as the Internet. For example, the network system 310 may be a private or public network, such as a local area network (LAN) or the Internet 270. In an alternative embodiment, the $1^{st}$ though $N^{th}$ computers 320-350 may be coupled together via an Intranet system. The actual connection between the $1^{st}$ though $N^{th}$ computers 320-350 and the Internet 270 may take on one or more of any of a variety of forms, such as a network interface card (NIC), a modem, a digital subscriber line (DSL), a cable modem, a wireless connection, and the like. The $1^{st}$ though $N^{th}$ computers 320-350 may include, for example, desktop computers or servers, such as an Apple Macintosh®, a classic Apple Mac®, a Power Mac G4®, a Power Mac G5®, an iMac®, an IBM compatible personal computer (PC), and the like. The $1^{st}$ though $N^{th}$ computers 320-350 may also be portable devices, such as the Apple PowerBook® or iBook® offered by Apple Computers, Inc.

The network system 310 may also comprise an adaptive power-save mode control unit 260, which may be centralized into one of several portions of the network system 310, wherein the $1^{st}$ though $N^{th}$ computers 320-350 may be influenced by the adaptive power-save mode control unit 260 residing in the network system 310. Therefore, inactivity or idleness detected by the various $1^{st}$ though $N^{th}$ computers 320-350 may cause implementation of power-save modes based upon control provided by the adaptive power-save mode control unit 260 residing in the network system 310. In an alternative embodiment, each of the $1^{st}$ though $N^{th}$ computers 320-350 may comprise its own adaptive power-save mode control unit 260.

Figure 4:
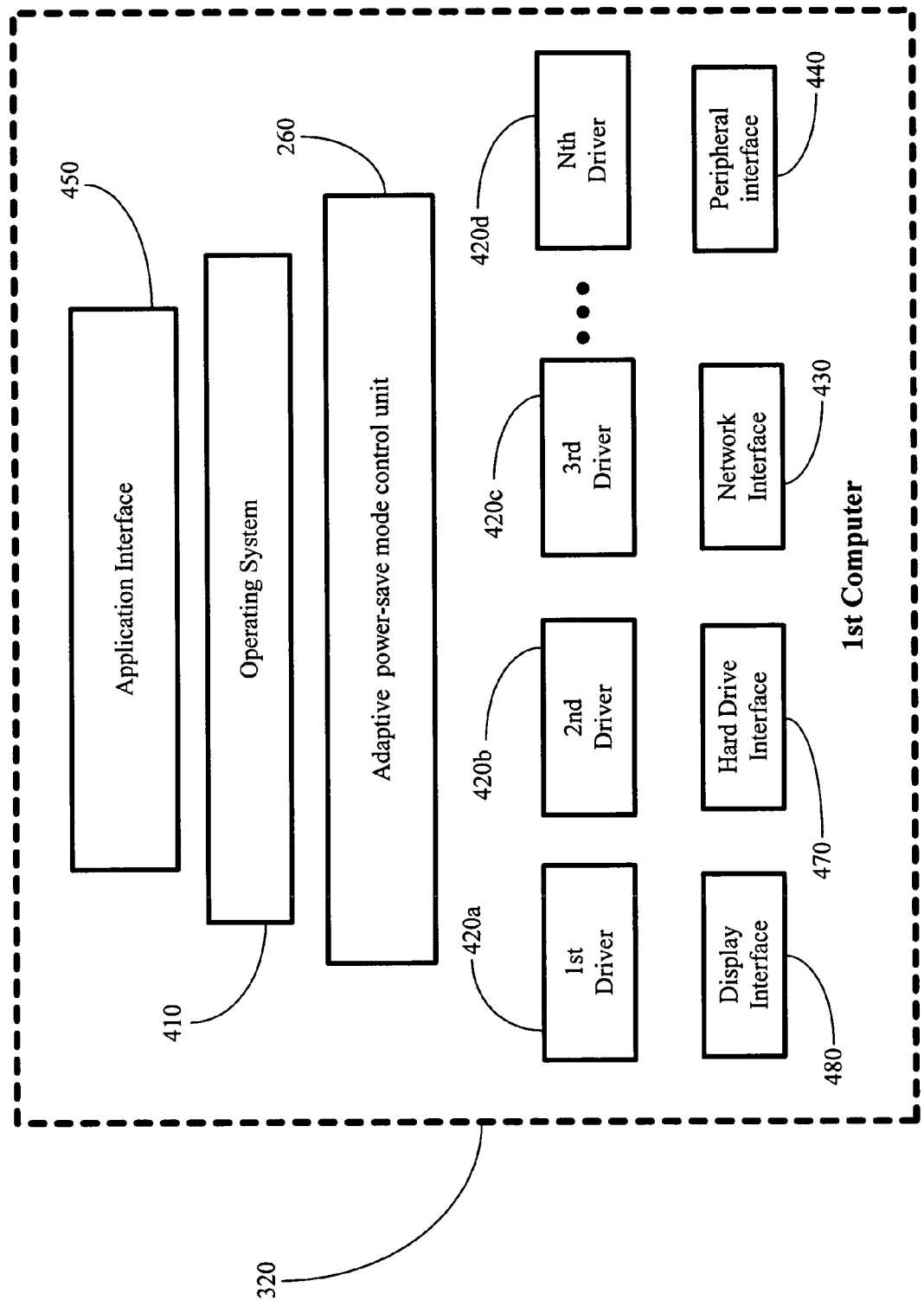
FIG. 4 illustrates a stylized block diagram illustration of one of the plurality of computers of FIG. 3, in accordance with one illustrative embodiment of the present invention.

Turning now to FIG. 4, a block diagram depiction of an exemplary $1^{st}$ computer 320 is illustrated. Although FIG. 4 is described in the context of the $1^{st}$ computer system, those skilled in the art having benefit of the present disclosure would appreciate that these concepts may be relevant to any type of devices in accordance with embodiments of the present invention. The $1^{st}$ computer 320 may comprise an operating system 410, a network interface 430, a peripheral interface 440, a hard drive interface 470, a display interface 480 and an application interface 450. The $1^{st}$ computer 320 may comprise an operating system 410 to control various operations performed by the $1^{st}$ computer 320. Additionally, the $1^{st}$ computer 320 may comprise a peripheral interface 440, a network interface 430, a hard drive interface 470, a display interface 480, and/or an application interface 450.

The hard drive interface 470 provides for communications between a hard drive associated with the $1^{st}$ computer 320, the $2^{nd}$ driver 420b, and any peripheral operatively coupled with the $1^{st}$ computer 320. The display interface 480 provides for an interface protocol between the $1^{st}$ computer 320 and a display device. The peripheral interface 440 may comprise various software, hardware, and/or firmware objects that are capable of interfacing with various peripheral devices interfaced with the $1^{st}$ computer 320.

The network interface 430 allows for interaction of the $1^{st}$ computer 320 with various other devices illustrated in FIGS. 2 and 3. The network interface 430 is capable of receiving and sending transmission requests and facilitating network communications. The application interface 450 is capable of facilitating communications between the operating system 410, various peripheral devices, and applications that may reside on the $1^{st}$ computer 320.

The $1^{st}$ computer 320 may also comprise a plurality of drivers, such as the $1^{st}$ driver 420a, $2^{nd}$ driver 420b, a $3^{rd}$ driver 420c through an $N^{th}$ driver 420d for driving the operations of various peripheral devices, such as the $1^{st}$ through $N^{th}$ peripheral devices 220-250. The term "N" in the context of "$N^{th}$" may represent any integer. Various $1^{st}$ through $N^{th}$ device drivers 420a-420d may be capable of driving the operation of various peripheral devices, such as the $1^{st}$ through $N^{th}$ peripheral devices 220-250. The adaptive power-save mode control unit 260 provides the ability for the $1^{st}$ computer 320 to implement an adaptive delay in the implementation of power-save mode based upon any detected annoyance factors or distractions from the user. The operating system 410, in conjunction with the $1^{st}$ through $N^{th}$ drivers 420a-420d uses the adaptive power-save mode control unit 260 to invoke adaptive delays of the power-save mode encountered by the $1^{st}$ computer 320. It will be appreciated by those skilled in the art that the $1^{st}$ computer 320 is being described using the adaptive power-save mode control unit 260, however, using the concepts provided in the present disclosure may be implemented into a variety of devices and remain within the spirit and scope of the present invention. Further details associated with the operation of the adaptive power-save mode control unit 260 are provided in various figures and accompanying description below.

Figure 5:
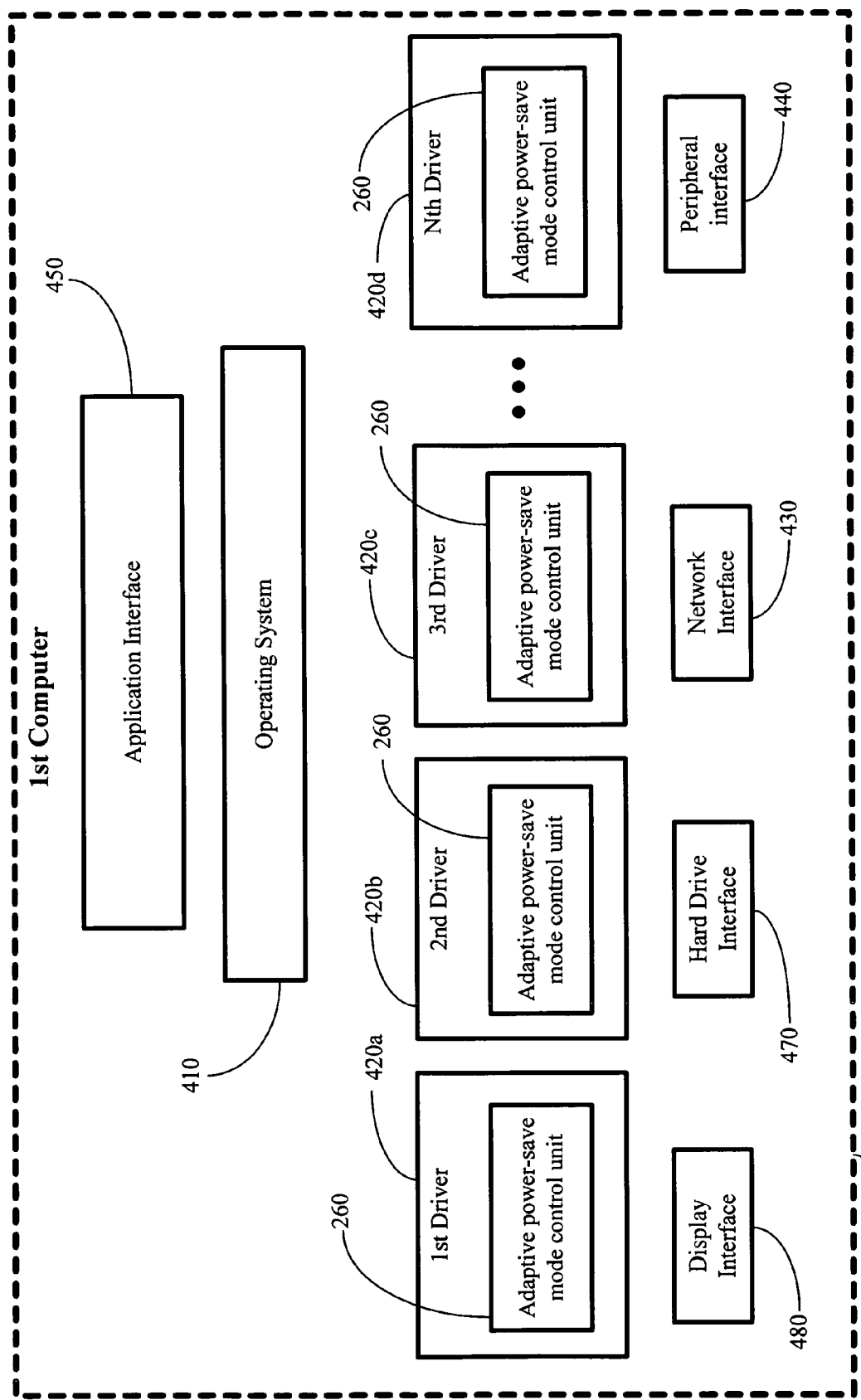
FIG. 5 illustrates another stylized block diagram illustration of one of the plurality of computers of FIG. 3, in accordance with an alternative illustrative embodiment of the present invention.

Turning now to FIG. 5, a block diagram depiction of an alternative embodiment of the $1^{st}$ computer 320 is illustrated. FIG. 5 illustrates that the $1^{st}$ computer 320 comprises an operating system 410, a network interface 430, a peripheral interface 440, a hard drive interface 470, a display interface 480, and an application interface 450. The $1^{st}$ computer system 320 also comprises the $1^{st}$ through $N^{th}$ drivers 420a-420d to drive the operation of various peripheral devices 220-250 associated with the device 210. In the illustration of FIG. 5, the adaptive power-save mode control unit 260 may reside in individual drivers. Therefore, the $1^{st}$ driver 420a may comprise its own adaptive power-save mode control unit 260 and the $2^{nd}$ through $N^{th}$ devices 420b-420d may also comprise individual adaptive power-save mode control units 260.

The embodiment implemented in FIG. 5 provides for each driver 420a-420d implementing its own version of adaptive power-save mode delay, based upon the type of usage associated with a particular peripheral device associated with the particular driver. For example, the $1^{st}$ driver 420a may be associated with a computer monitor, which requires a different type of adaptive power-save mode as compared to a disk drive associated with a $2^{nd}$ driver 420b. Therefore, a user using the data from a display device, such as a monitor, may require shorter periods of time when the user is actually reading data from the monitor; accordingly, a first type of adaptive scheme may be used for the monitor. A user interfacing with a computer may access the hard drive associated with the computer in a different way, therefore, a second type of adaptive power-save mode may be implemented by a $2^{nd}$ driver 420b associated with a hard drive. In this way, the power-save modes for different peripheral devices may be tailored to specific types of peripheral devices by the drivers 420a-420d.

Figure 6:
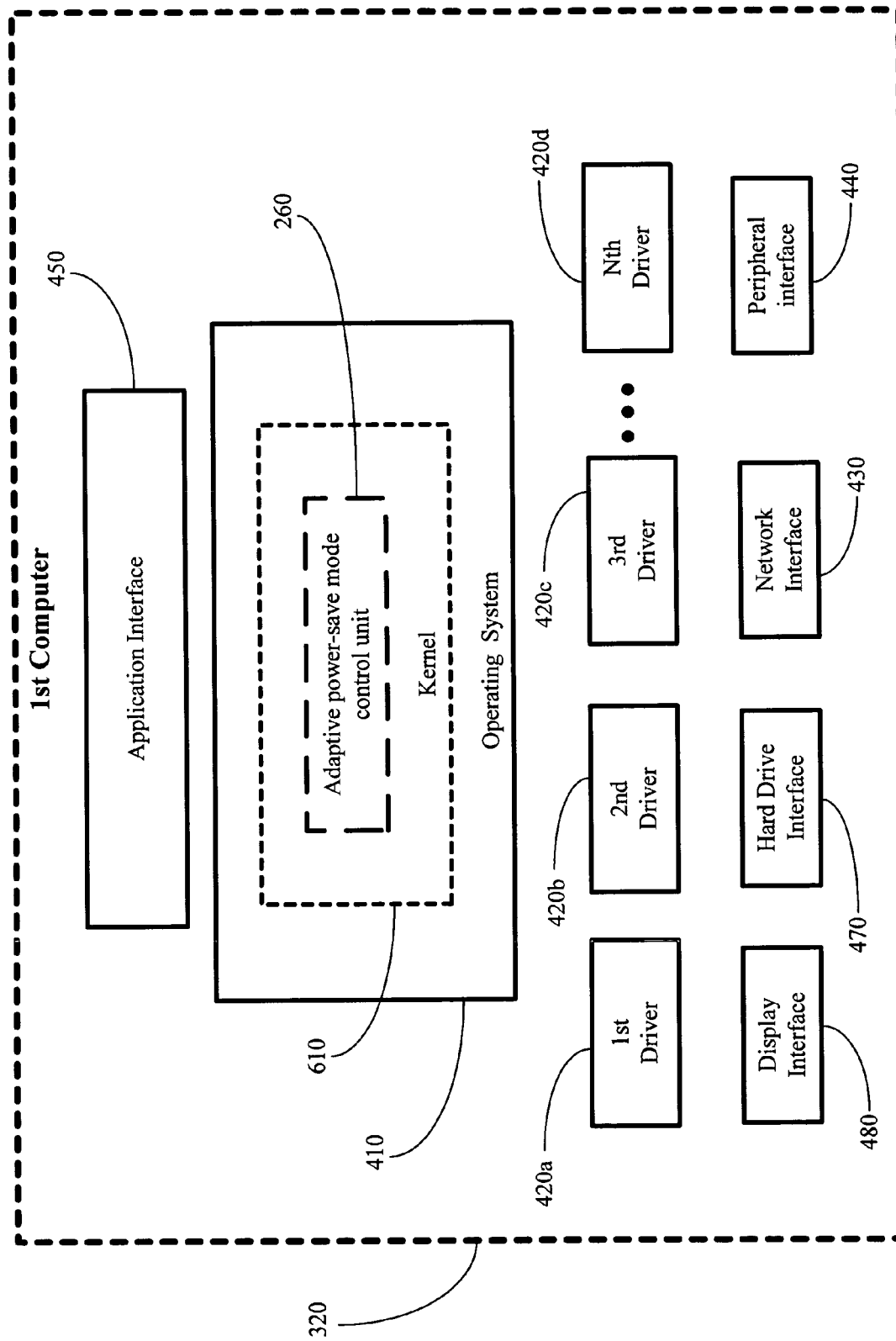
FIG. 6 illustrates yet another stylized block diagram illustration of one of the plurality of computers of FIG. 3, in accordance with yet another alternative illustrative embodiment of the present invention.

Turning now to FIG. 6, yet another alternative embodiment of the implementation of the $1^{st}$ computer 320 is illustrated. FIG. 6 illustrates that the $1^{st}$ computer 320 comprises an operating system 410, a network interface 430, a peripheral interface 440, a hard drive interface 470, a display interface 480, and an application interface 450. FIG. 6 also illustrates a kernel 610 associated with the operating system 410. In one embodiment, the kernel 610 is a fundamental part of the operating system 410. The kernel 610 may be a software, hardware, and/or firmware portion that is responsible for providing access to the various peripheral devices or other hardware associated with the $1^{st}$ computer 320. The kernel 610 provides essential services required by the operating system 410, the applications residing on the $1^{st}$ computer 320, and/or various portions of a computer and other peripheral devices.

In one embodiment, the adaptive power-save mode control unit 260 may be implemented into the kernel 610 of the operating system 410. In this way, the $1^{st}$ through $N^{th}$ drivers 420a-420d may control the adaptive power-save mode of various peripheral devices using the common adaptive power-save mode control unit 260 located within the operating system 410. In one embodiment, the adaptive power-save mode control unit 260 may be used by individual drivers 420a-420d to implement different adaptive power-save modes tailored to their respective peripheral devices. It will be appreciated by those skilled in the art that other implementation of the adaptive power-save mode control unit 260 may be performed into a computer system or any other device and still remain within the spirit and scope of the present invention.

Figure 7:
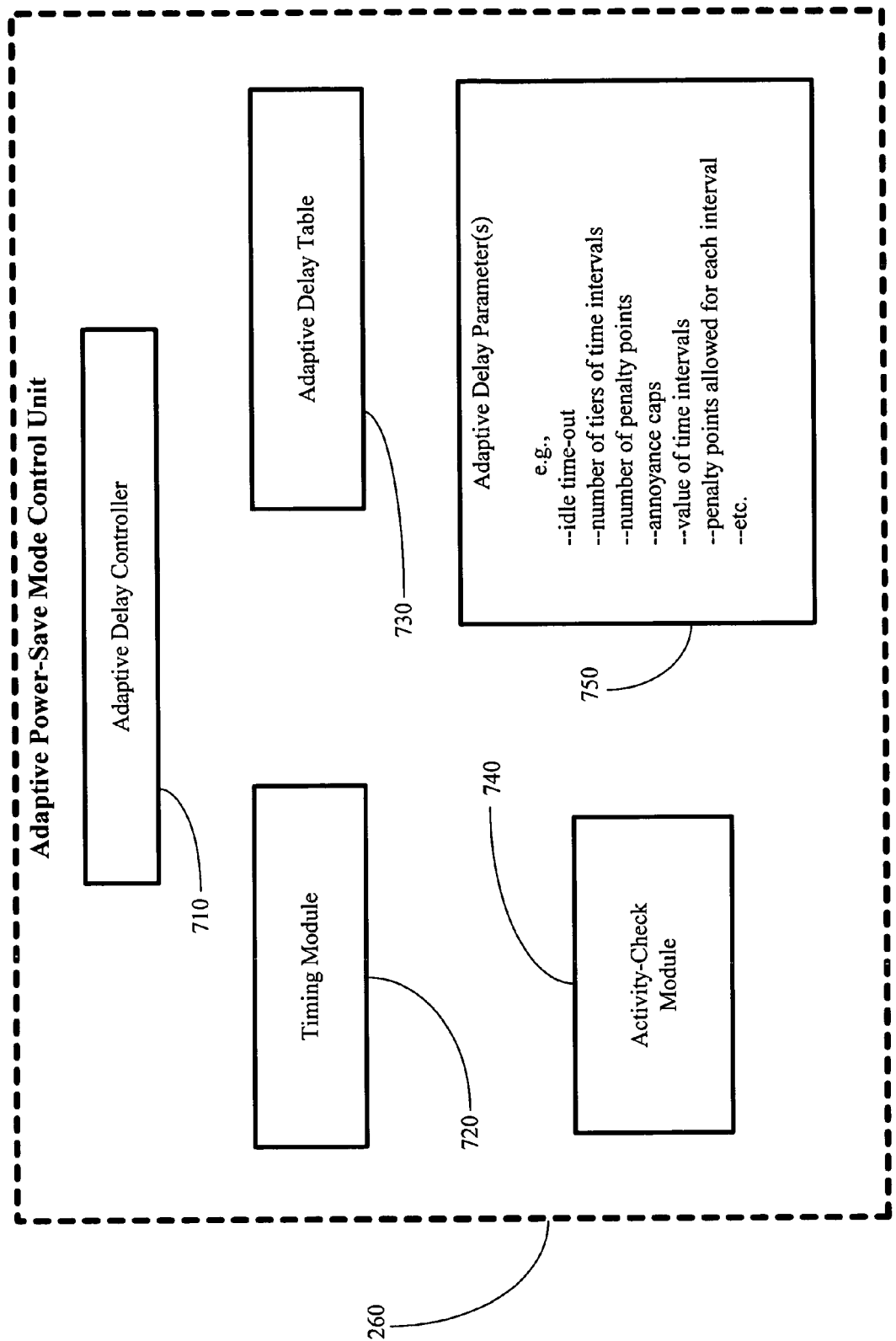
FIG. 7 illustrates a more detailed block diagram depiction of the adaptive power-save mode control unit, in accordance with yet another alternative illustrative embodiment of the present invention.

Turning now to FIG. 7, a block diagram depiction of the adaptive power-save mode control unit 260 in accordance with one embodiment of the present invention is illustrated. In one embodiment, the adaptive power-save mode control unit 260 comprises an adaptive delay controller 710, a timing module 720, an adaptive delay table 730, an activity-check module 740, and a set of adaptive delay parameters 750. The various blocks illustrated in FIG. 7 may comprise hardware modules, software modules, firmware modules or any combination thereof. The adaptive delay controller 710 may comprise software code that is capable of controlling the implementation of various adaptive power-save modes provided by embodiments of the present invention. This may include an adaptive change in the time period in which a peripheral device or any portion of a device 210 is placed in a power save-mode, which may include dimming of a display unit, stopping the spinning of a hard drive or CD/DVD drive, reduction in operating speed of a device, and/or any other attenuation of normal operation. The adaptive delay controller 710 is capable of receiving data from the timing module 720, the adaptive delay table 730, the activity-check module 740, and/or data relating to the adaptive delay parameters 750, and determining a particular type of power-save-mode to be implemented.

The timing module 720 is capable of performing a timing function to determine the amount of time that a particular device has been in an inactive state. Additionally, the timing module 720 is capable of determining the time period between the time when a device 210 enters the power-save mode and the time when a power-up activity/event is detected, bringing the device 210 out of the power-save mode. The activity-check module 740 is capable of monitoring for idleness associated with the device 210 and/or detecting a power-up activity or event that may bring a device 210 out of a power-save mode.

The adaptive delay table 730 is capable of storing data associated with implementing the adaptive power save mode. For example, the adaptive delay table 730 may store various idle times, annoyance factors associated with a power-up activity, penalty points (described in further detail below) associated with penalizing a power-down or power-save mode due to detected annoyance factors, etc. The adaptive delay table 730 may store such data corresponding to a plurality of devices. Therefore, the adaptive delay controller 710 may receive power savings related data corresponding to a particular device from the adaptive delay table 730 for implementation of the adaptive power-save mode for the device.

The adaptive power-save mode control unit 260 may also comprise a set of adaptive delay parameters 750 that may be used by the adaptive delay controller 710 in order to vary the time periods required to enter into a power-save mode. The adaptive delay parameters 750 may include factors, such as idle time out parameters, that define the amount of idle time required before a time out is deemed to have occurred for a device to enter a power-save mode. The adaptive delay parameters 750 may also include a number of tiers of timing-related levels associated with an annoyance factor. For example, a fast response within a predetermined time period may include one tier of time interval for detecting one magnitude of an annoyance factor, and a second tier of time interval for detecting a second annoyance factor may include another magnitude of an annoyance factor.

Additionally, the adaptive delay parameters 750 may comprise rules that may determine what factors are used to determine whether an annoyance has taken place. This may include data such as how quickly the power-up activities are detected upon entering a power-save mode, the force in which a key stroke or a mouse entry is provided by the user, and the like. A predetermined force threshold may be used by the adaptive power-save mode control unit 260 to determine if sufficient force was used by the user to initiate the power-up event to bring the device 210 out of the power-save mode. The term "key stroke" may relate to, but is not limited to, striking of any key on a keyboard, any input mechanism associated with a device, such as a mouse input, etc. The parameters may also comprise the number of penalty points that are charged to each interval to characterize an annoyance factor. The adaptive delay parameters 750 may also include the value of time intervals and penalty points allowed for each interval, which may be used to determine the amount of time a subsequent idle time period is required before entering a power save mode. The various adaptive delay parameters 750 may be programmable and/or changeable to affect the implementation of the adaptive power-save mode provided herein.

Figure 8:
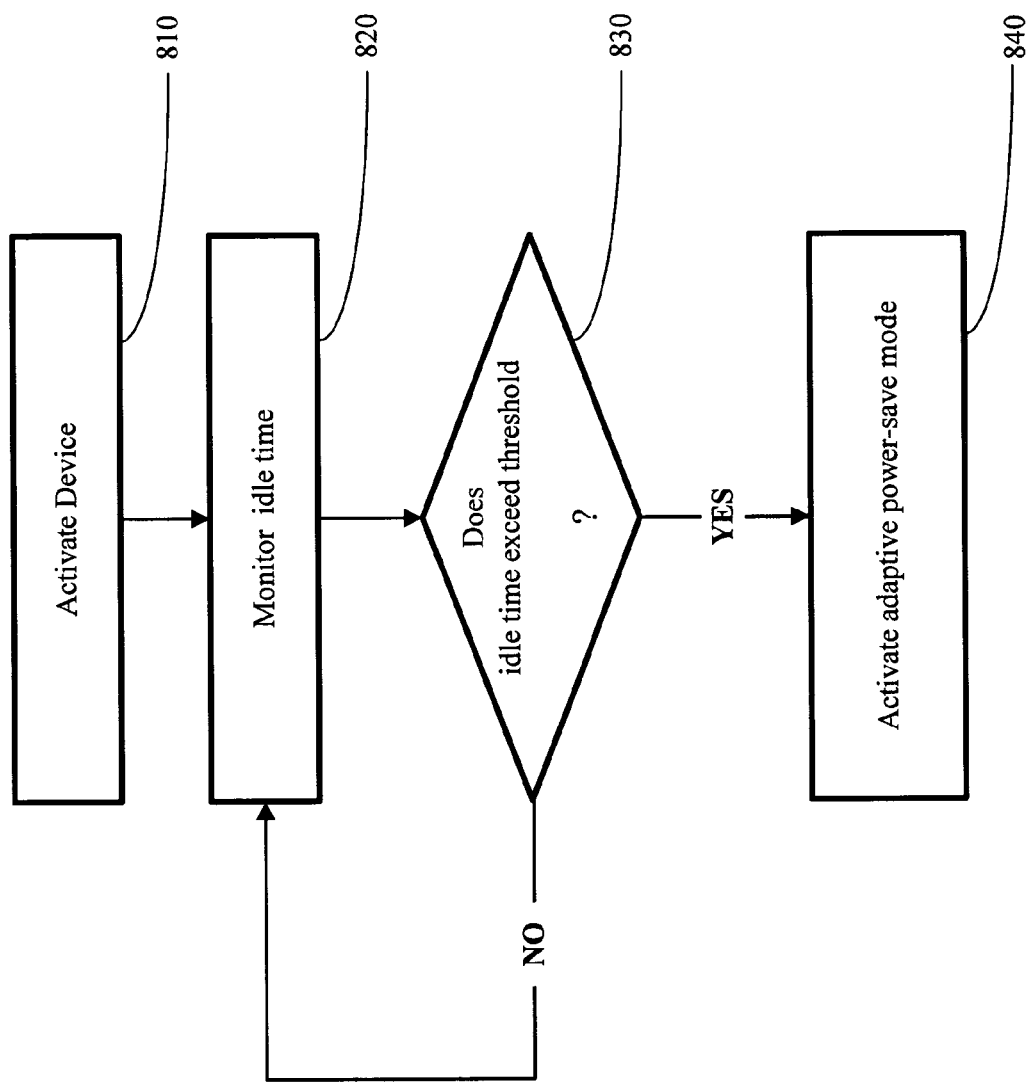
FIG. 8 illustrates a flowchart depiction of a method for activating an adaptive peripheral power-save mode, in accordance with yet another alternative illustrative embodiment of the present invention.

Turning now to FIG. 8, a flow chart depiction of the method associated with embodiments of the present invention is illustrated. A device 210 is activated for normal operation (block 810). During the operation of the device 210, the idle time of the device 210 is monitored (block 820). Based upon the idle time, a determination is made whether the idle time exceeds a threshold for entering a power-save mode (block 830).

Upon a determination that the idle time has not exceeded a predetermined threshold required for entering a power-save mode, the idle time is continuously monitored. When a determination is made that the idle time has indeed exceeded or met the predetermined threshold to enter a power-save mode, an adaptive power-save mode is activated (block 840). A more detailed description of the adaptive power-save mode is provided in FIGS. 9 and 10 and accompanying description below. The blocks described in FIG. 8 may be performed by a device 210 being monitored or a remote device, such as a network computer.

Figure 9:
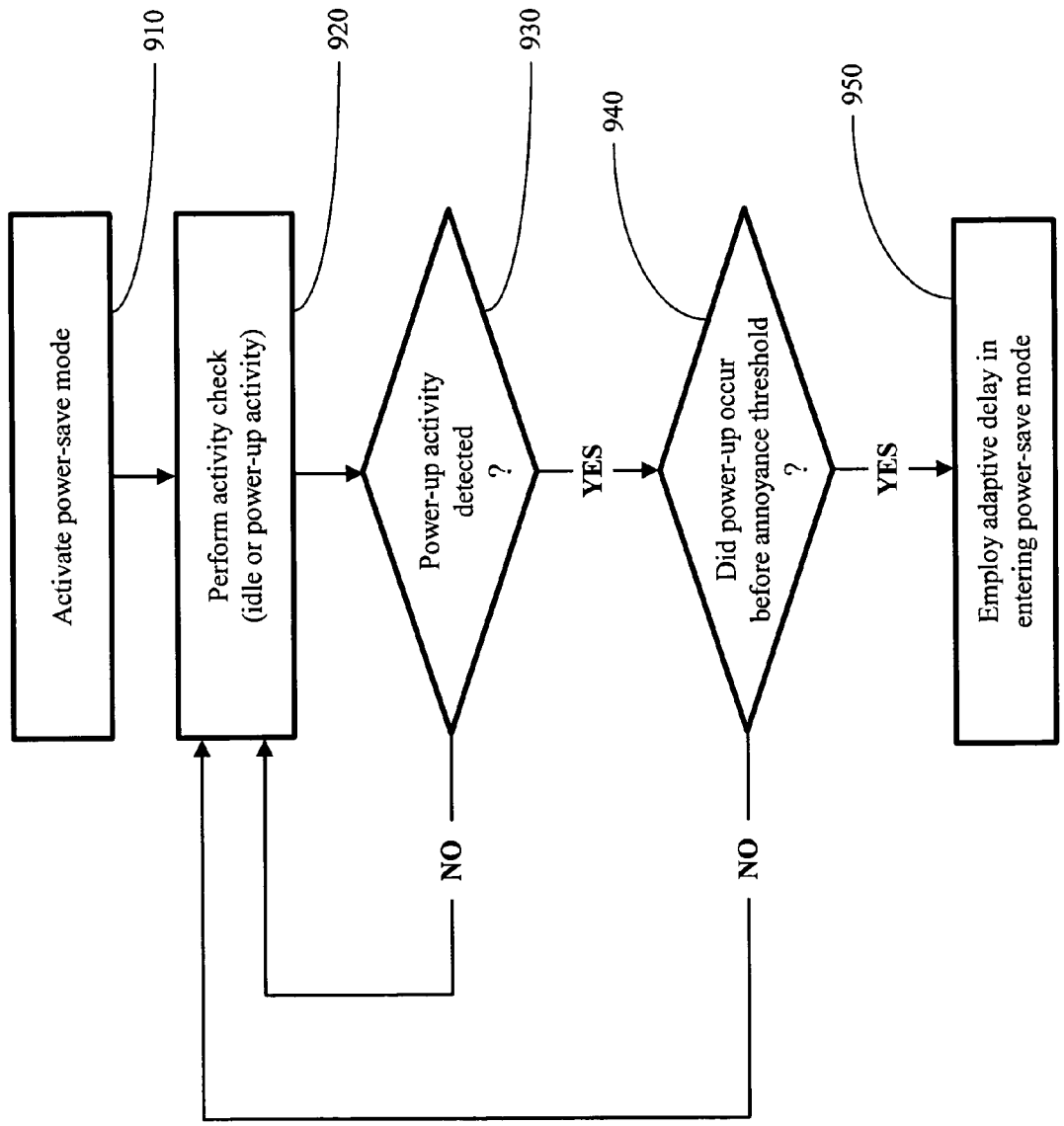
FIG. 9 illustrates a more detailed flowchart depiction of the steps associated with the adaptive peripheral power-save mode of FIG. 8, in accordance with yet another alternative illustrative embodiment of the present invention.

Turning now to FIG. 9, a more detailed description of the adaptive power-save mode described in block 840 of FIG. 8 is illustrated. Upon detection of the idle time threshold described in FIG. 8, the implementation of the power-save mode is performed (block 910). Upon implementation of the power-save mode, the adaptive power-save mode control unit 260 performs an activity check, which may include a check to see if a particular device 210 is in idle mode or whether a power-up activity has been detected (block 920). Based upon the activity check, a determination is made whether a power-up activity has been detected (block 930). When a determination is made that a power-up activity has not been detected, the adaptive power-save mode control unit 260 continues to perform the activity check, checking for the idle state and/or for a power-up activity.

Upon detection that the power-up activity has been detected, the adaptive power-save mode control unit 260 determines whether the power-up activity occurred before an annoyance threshold (block 940). In other words, factors or circumstances associated with the power-up activity are monitored to detect whether the user may have been annoyed as a result of the power-save mode. This may be determined by examining the time period between the detection of the power-up activity following a power-save mode. Other factors may be used to determine an annoyance threshold, such as a message from the user, a detection of a force with which the user may have struck a key, and/or any other annoyance calculation measures.

Figure 10:
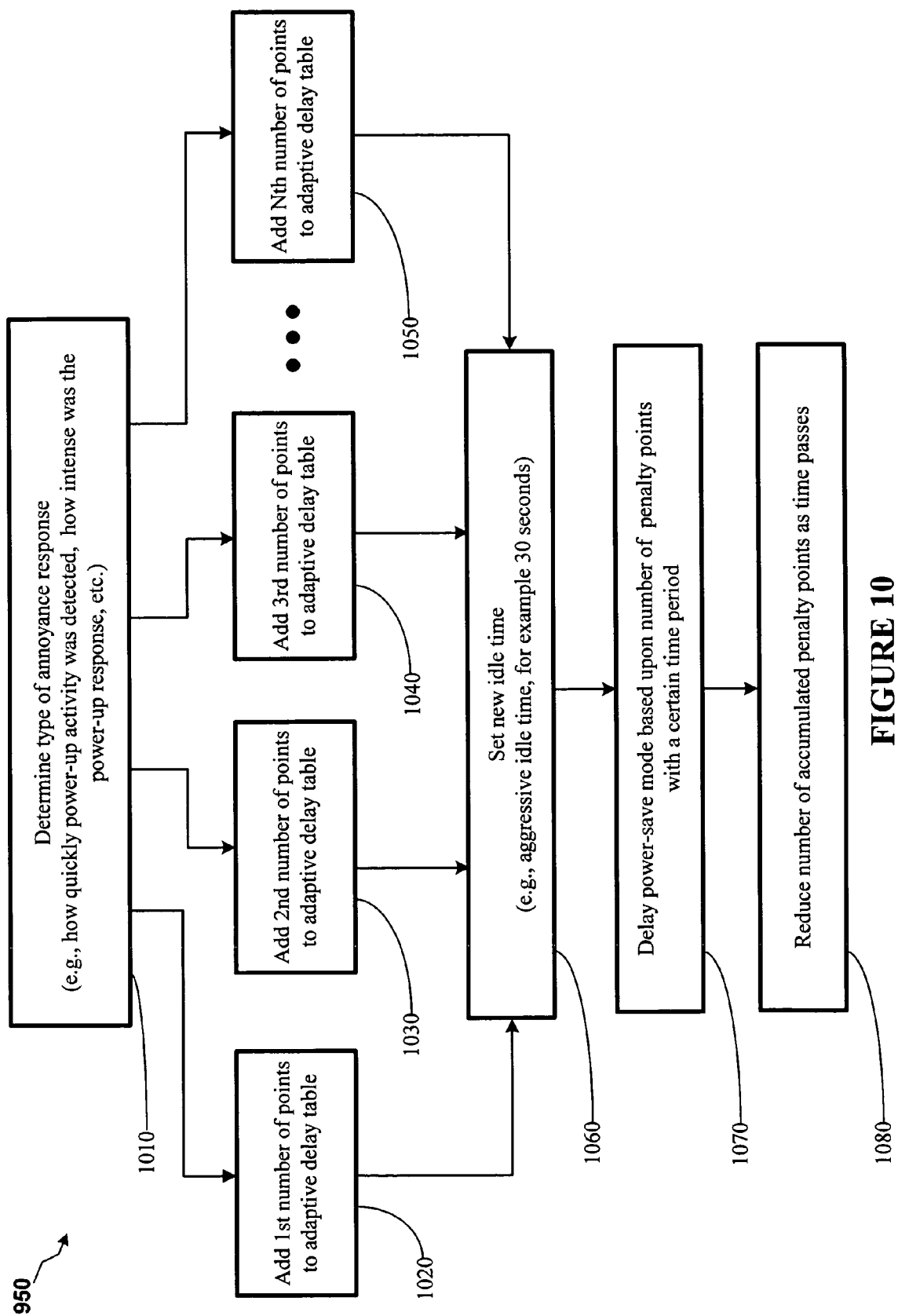
FIG. 10 illustrates a more detailed flowchart depiction of the steps associated with employing an adaptive delay in entering a power-save mode, as provided in FIG. 9, in accordance with yet another alternative illustrative embodiment of the present invention.

When a determination is made that the power-up activity did not occur before an annoyance threshold, then the normal activity check may be continued to monitor the idle time or to check for a power-up activity. Upon detecting that an annoyance threshold has been crossed, the adaptive power-save mode control unit 260 employs an adaptive delay in entering the next power-save mode (block 950). Various rules may be implemented in a linear fashion or, alternatively, in a logarithmic fashion to increase or decrease the amount of time that may be required to enter into a power-save mode following a power-up activity that follows a power-save mode. In other words, the entry of a power-save mode may be adaptively changed to minimize or reduce an annoyance factor associated with the user. Various rules may be employed to implement the adaptive delay described in block 950. In FIG. 10, an exemplary implementation of the adaptive delay described in block 950 is illustrated.

Turning now to FIG. 10, a block diagram depiction relating to employing an adaptive delay process and entering a power-save mode is provided. The adaptive power-save mode control unit 260 determines the type of annoyance response detected as a result of the user input (block 1010). This may include determining how quickly the power-up activity was detected following a power-save mode and determining an annoyance factor threshold. The annoyance factor threshold may relate to a power-up delay threshold that is met or exceeded to arrive at a conclusion that a user may be annoyed by a perceived premature initiation of a power-save mode, e.g., dimming of a display screen even though the user is reviewing information displayed on the display screen. The power-up delay threshold may relate to an expected delay of a power-up response from the user upon initiation of a power-save mode. In other words, if the user responds with a power-up response in a relatively fast manner, then a conclusion that the user may be annoyed by the power-save mode or that the user may not desire the power-save mode, may be made.

As another example of examining the annoyance factor threshold, an intensity of the keyboard strike or the mouse input may be detected. Other manual or automatic inputs from the user may be received in order to determine the annoyance response of block 1010. For example, if the power-up activity is detected less than three seconds subsequent to the entry into a power-save mode, a first annoyance threshold is deemed to have occurred. This annoyance threshold may be associated with a large number of penalty points, such as eight points. The adaptive power-save mode controller 260 (shown in FIG. 7) then keeps track of the annoyance factor and the penalty points.

As another example, if the power-up activity is detected four to ten seconds after the entry into a power-save mode, a second annoyance threshold is deemed to have taken place. A penalty point of four points, for example, may be associated with the second annoyance threshold. As yet another example, if the power-up sequence is detected between eleven and sixty seconds after the implementation of the power savings mode, a third annoyance threshold is deemed to have occurred. An exemplary two penalty points may be charged in conjunction with the third annoyance threshold. As another example, an exemplary one penalty point may be charged in conjunction with the $N^{th}$ annoyance threshold (where N is any integer, e.g., a $4^{th}$ computer).

The first annoyance threshold may be associated with a first annoyance type or factor, the second annoyance threshold may be associated with a second annoyance type or factor, the third annoyance threshold may be associated with a third annoyance type or factor, and the $N^{th}$ annoyance threshold may be associated with an $N^{th}$ annoyance type or factor. Upon a determination that the first annoyance type has occurred, the adaptive power-save mode control unit 260 adds the first number of points, e.g., the eight penalty points described above, to the adaptive delay table 730 (shown in FIG. 7). These penalty points may be added in a cumulative manner (block 1020). Upon a determination that the second annoyance type has been detected, the adaptive power-save mode control unit 260 adds the second number of points to the adaptive delay table 730, such as the four penalty points described above (block 1030). Upon a determination that the third annoyance type has been detected, the adaptive power-save mode control unit 260 adds a third number of penalty points to the adaptive delay table 730, which for example may be the two penalty points as described above. Upon a detection of the $N^{th}$ annoyance type, the adaptive power-save mode control unit 260 adds the $N^{th}$ number of penalty points to the adaptive delay table 730, e.g., the one penalty point described above. Any number of annoyance types may be implemented and this adaptive delay parameter 750 may be controlled or changed by adjusting the number of tiered time intervals described in the adaptive delay parameter 750 in FIG. 7.

Upon accumulation of the appropriate number of penalty points based upon the annoyance type, the adaptive power-save mode control unit 260 may set a new idle time for entering a power-save mode (block 1060). For example, the new idle time may include a more aggressive idle time, such as thirty seconds before the next idle time is entered. However, the implementation of the power-save mode based on new idle time may be qualified by various rules depending on the number of points that have been accumulated. In other words, the implementation of the power-save mode may be delivered based upon the number of penalty points within a certain time period (block 1070). This effectively increases the amount of idle time that may be required before the next power-save mode is implemented due to the annoyance factor detected during the previous power-up activity.

Examples of delaying the power-save mode based upon the number of points within a certain period may include a rule that requires that no more than four points may be allowed within two minutes and additional points will not be allowed to be accumulated because the power-save mode may be delayed to effectuate this rule. Other exemplary rules may include that no more than eight points may be accumulated within five minutes. Additionally, no more than twelve points may be accumulated within ten minutes and no more than sixteen points may be accumulated within fifteen minutes of having entered a power-save mode. These rules may be implemented individually, in conjunction with one another, or in conjunction with various additional rules. By implementing these rules, the more annoyance that is detected by the user, the less likely it is that the power-save mode will be implemented within a short time. In other words, the more annoyed the user, the longer it will take to enter a power-save mode. This reflects the fact that the user may actually be reading data from a screen even though no activity is detected.

Upon detecting annoyance by the user, the power-save mode e.g., the dimming of the screen, will be delayed to reduce annoyance by the user. However, as time passes, a reduction in the number of accumulated penalty points may be implemented (block 1080). In other words, the longer the time period since a significant annoyance factor has been detected, the more likely it is that the annoyance of the user has diminished. Alternatively, the longer the time period since a significant annoyance factor has been detected, the more likely it is that the user has indeed finished utilizing the device and a power-save mode may be desirable. Additionally, after a certain amount of time, the resetting or diminishing of the penalty point would cause the adaptive power-save mode to revert back to the normal power-save mode, since the user may be finished using the device.

There are various ways to reduce, diminish, or delay the implementation of the adaptively delayed power-save mode. In one embodiment, as time passes, older annoyance factors will stop being counted towards the total penalty points charged in each interval until they are eliminated from the adaptive delay table 730 altogether. Therefore, as time passes, a more aggressive power-save mode time will apply. Alternatively, the number of penalty points assigned to an annoyance type may decay as the event becomes further and further in the past. For example, an annoyance that was initially charged eight penalty points might be attenuated to be worth only four points after a certain amount of time, e.g., after five minutes. This initially severe penalty point may further diminish to two penalty points after ten minutes, and then attenuated down to one penalty point after fifteen minutes, and finally to zero points after an additional amount of time. In this way, older annoyance types are diminished as more time passes. Utilizing this scheme, a more reactive and adaptive implementation of the power-save mode is provided. Additionally, as time goes by, and the adaptive or delayed power savings mode may no longer be needed, normal power savings implementation is resumed. Therefore, computers and other devices may be utilized with reduced amounts of annoyances while still maintaining power savings. Utilizing embodiments of the present invention, a more robust use of a device, such as a battery operated device is made possible without comprising battery life of such a device. Embodiments of the present invention may be implemented in a wide variety of devices, such as computers, telephones, portable computing devices, and the like.

The particular embodiments disclosed above are illustrative only, as the invention may be modified and practiced in different but equivalent manners apparent to those skilled in the art having the benefit of the teachings herein. Furthermore, no limitations are intended to the details of construction or design shown herein, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
   monitoring an idle time period associated with a device; and
   providing an adaptive power-save mode upon a determination that said idle time period has exceeded a predetermined threshold, providing said adaptive power-save mode comprising detecting a type of a power-up response subsequent to an initiation of a power-save mode and modifying said predetermined threshold based upon said type of power-up response.

2. The method of claim 1, wherein detecting said type of a power-up response further comprises detecting a time-period between an initiation of said power-save mode and said power-up response and at least one additional characteristic of said power-up response.

3. The method of claim 2, wherein detecting said type of a power-up response further comprises determining that an annoyance factor threshold has been met in response to a determination that a force relating to a key strike is greater than a predetermined force threshold.

4. The method of claim 2, wherein detecting said type of a power-up response further comprises determining that an annoyance factor threshold has been met in response to a determination that a time period between an initiation of said power-save mode and said power-up response is below a power-up delay threshold.

5. The method of claim 4, wherein modifying said predetermined threshold comprises increasing a time period associated with said predetermined threshold relating to an idle time preceding an initiation of a power-save mode.

6. The method of claim 4, further comprising modifying said predetermined threshold based upon said annoyance factor.

7. The method of claim 6, wherein modifying said predetermined threshold based upon said annoyance factor threshold factor further comprises increasing said time period relating to said predetermined threshold relating to an idle time preceding an initiation of said power-save mode.

8. The method of claim 6, wherein modifying said predetermined threshold based upon said annoyance factor threshold factor further comprises decreasing said time period relating to said predetermined threshold relating to an idle time preceding an initiation of said power-save mode.

9. A method, comprising:
    initiating a power-save mode associated with a device;
    determining whether a power-up response has occurred subsequent to said initiating of said power-save mode;
    characterizing said power-up response based upon the type of said power-up response; and
    modifying an idle time period associated with initiating said power-save mode based upon said characterizing of a power-up event.

10. The method of claim 9, wherein initiating said power-save mode associated with said device further comprises dimming a display associated with said device.

11. The method of claim 9, wherein characterizing said power-up response further comprises determining that a threshold has been met in response to a determination that said time period between said initiation of said power-save mode and said power-up response is below a power-up delay threshold and at least one additional characteristic of said power-up response.

12. The method of claim 9, wherein modifying said idle time period associated with initiating said power-save mode further comprises increasing said idle time required to initiate a subsequent power-save mode.

13. A method, comprising:
    monitoring a device for detecting a power-up event subsequent to an initiation of a power-save mode associated with said device;
    determining whether said power-up event occurred before a predetermined time period; and
    delaying an initiation of a subsequent power-save mode based upon a determination that said power-up event occurred before said predetermined time period and at least one additional characteristic of said power-up event.

14. An apparatus, comprising:
    means for monitoring a device for detecting a power-up event subsequent to an initiation of a power-save mode associated with said device;
    means for determining whether said power-up event occurred before a predetermined time period; and
    means for delaying an initiation of a subsequent power-save mode based upon a determination that said power-up event occurred before said predetermined time period and at least one additional characteristic of said power-up response.

15. A system, comprising:
    a device adapted to initiate a power-save mode based upon an idle time associated with an operation of said device; and
    a controller operatively coupled to said device, said controller adapted to determine whether a power-up response has occurred subsequent to an initiating of said power-save mode, the controller also being adapted to modify an idle time period associated with initiating said power-save mode based upon the type of said power-up event.

16. The system of claim 15, wherein said device is at least one of an interactive keyboard, an interactive mouse, a set of front panel switches, and a touch screen interface.

17. The system of claim 15, further comprising:
    an operating system to control an operation of said computer device; and
    at least one driver operatively coupled to said operating system to control an operation of said device.

18. The system of claim 17, further comprising at least one of a display interface, a hard drive interface, a network interface, and a peripheral interface.

19. The system of claim 18, further comprising an adaptive power-save mode control unit, said adaptive power-save mode control unit being adapted to modify said idle time period associated with initiating said power-save mode based upon said characterizing of said power-up event.

20. The system of claim 19, wherein said adaptive power-save mode control unit is integrated within said operating system.

21. The system of claim 20, wherein said adaptive power-save mode control unit is integrated within said driver.

22. A computer system, comprising:
    a peripheral device adapted to initiate a power-save mode based upon an idle time associated with an operation of said device; and
    a controller operatively coupled to said device, said controller adapted to determine whether a power-up response has occurred subsequent to an initiating of said power-save mode, the controller also being adapted to modify an idle time period associated with initiating said power-save mode based upon said power-up event and at least one additional characteristic of said power-up response.

23. The computer system of claim 22, wherein further comprising an adaptive power-save mode control unit, said adaptive power-save mode control unit being adapted to modify said idle time period associated with initiating said power-save mode based upon said characterizing of said power-up event.

24. A computer readable program storage device encoded with instructions that, when executed by a computer, performs a method, comprising:
    monitoring an idle time period associated with a device; and
    providing an adaptive power-save mode upon a determination that said idle time period has exceeded a predetermined threshold, providing said adaptive power-save mode comprising detecting a type of a power-up response subsequent to an initiation of a power-save mode and modifying said predetermined threshold based upon said type of power-up response.

25. The computer readable program storage device encoded with instructions that, when executed by a computer, performs the method of claim 24, wherein modifying said predetermined threshold further comprises increasing a time period associated with said predetermined threshold relating to an idle time preceding said initiation of a power-save mode.

26. A method, comprising:
    receiving data relating to a power-up event relating to a device in a power-save mode;
    determining whether said power-up event occurred before a predetermined time period; and
    delaying an initiation of a subsequent power-save mode based upon a determination that said power-up event occurred before said predetermined time period, and upon at least one additional characteristic of said power-up event.

27. An adaptive power-save control unit, comprising:
    a controller adapted to determine whether a power-up response has occurred subsequent to an initiating of said power-save mode, the controller also being adapted to modify an idle time period associated with initiating said power-save mode based upon said power-up event, and upon at least one additional characteristic of said power-up event.

28. A computer readable storage device encoded with instructions that, when executed by a computer, provides for an adaptive power mode, the computer readable storage device, comprising:

a delay table comprising data relating a power-save mode, wherein said data comprises information relating to determining whether said power-up event occurred before a predetermined time period and delaying an initiation of a subsequent power-save mode based upon a determination that said power-up event occurred before said predetermined time period, and at least one additional characteristic of said power-up response.

29. The computer readable storage device of claim 28, where said data relating to said power-save mode comprising at least one of an idle time period, data relating to a power-up activity, at least one penalty point relating to initiating said power-save mode, a time interval between said power-save mode and said power-up mode, a number to tiers associated with said time interval, and a value associated with said time interval.

* * * * *